6310X
J. Pratt.
Comb.
No
Patented Dec. 28 1830
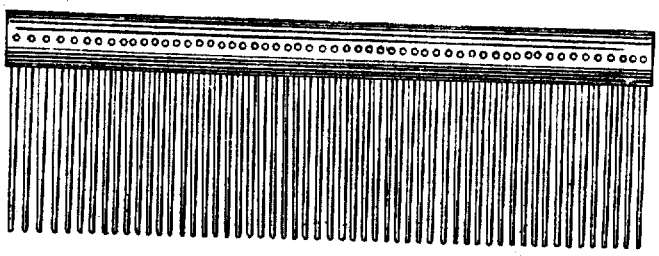
A. Back of Comb grain running lengthwise
B. Rivets to hold the Teeth

* Julius Pratt
X6310
Letters Patent

The Schedule referred to in these Letters Patent and making
part of the same containing a description in the words of the
said Julius Pratt himself of his improvement in the
mode of making Ivory, Bone & Wood Combs.
The combs may be made of Ivory or of the bones of Fish or
of the leg bones of Cattle and other animals, or of Turkey-box
or ebony or other hard and firm fine grained wood
and they may be made so as to answer the purpose of a
dressing or Redding Comb. The improvement of in the mode
of making combs for which a patent is claimed is as follows
First take a piece of Ivory bone or wood of a suitable size
and length which is to constitute the back of the comb, this
may be made cylindrical or oval and it may be shaped eith-
er by turning or other means but can be made most advantage-
ously by turning. This part of the comb must be so made that
the grain of the ivory, Bone or wood will run with the length
of the comb. This piece which is to form the back of the
comb must be perforated with holes of a proper size and
depth to hold the teeth firmly but they should not pass
through the back; the holes to be at such distances from
each other as the size of the teeth, and the fineness of the
comb may require. The holes for the guard teeth should be
made larger than the rest, and the teeth may be riveted
in for the sake of strength but this is not essential.
The teeth of the comb must be made with the grain running
lengthwise of the teeth and the best mode of making them is
by turning although they may be made by other means.
When the combs are made of wood the teeth may be fastened
into the back with glue, but when they are made of ivory
or bone they should be fastened with isinglass dissolved
in

* Disclaimer entered 9th April 1847

X6310 in spirits of Wine. The improvement in the combs made in this
manner, for which a patent is claimed consists in having the
back and teeth of the comb, both running with the grain of
the material of which they are made whereby their strength
and durability are greatly increased. This improvement is
particularly useful in the making of Ivory Combs. as it greatly
increases their strength and durability and enables the oper-
ator to construct the teeth of the comb, out of pieces or chips of
Ivory which are nearly useless for other purposes. This remark
is also applicable to combs made of bone or wood but the sav-
ing of expense is somewhat less when the comb is made of either of these
two last mentioned materials. I claim as my invention
and improvement the comb of the above description made of
Ivory, Bone or Wood, with the grain running lengthwise
with the teeth and back. I also claim as my invention and
improvement the mode of forming the back and teeth by turn-
ing them as above described. In testimony that the
above is a true specification of my said improvement as
above described I have hereto set my hand and seal this
nineteenth day of Pune in the year of our Lord one thou-
sand eight hundred and thirty Julius Pratt Witnesses
Seth P. Staples
John S. Staples 550 [illegible]